United States Patent [19]

Marcus et al.

[11] Patent Number: 4,486,819
[45] Date of Patent: Dec. 4, 1984

[54] VEHICLE VISOR LIGHTING APPARATUS

[75] Inventors: Konrad H. Marcus; Carl W. Flowerday; Dennis J. Fleming, all of Holland, Mich.

[73] Assignee: Prince Corporation, Holland, Mich.

[21] Appl. No.: 538,569

[22] Filed: Oct. 3, 1983

[51] Int. Cl.³ .................................................. F21V 33/00
[52] U.S. Cl. ..................................... 362/142; 362/80; 362/144; 362/216; 362/249; 362/250; 362/287; 362/295; 362/311; 296/97 H
[58] Field of Search ............... 296/97 H; 362/80, 135, 362/199, 142, 144, 186, 190, 191, 197, 200, 208, 216, 249, 250, 287, 295, 311, 368

[56] References Cited

U.S. PATENT DOCUMENTS

| | | | |
|---|---|---|---|
| 1,957,847 | 5/1934 | Peters | 45/97 |
| 2,228,209 | 1/1941 | Harrington | 296/97 |
| 2,289,644 | 7/1942 | Gano, Jr. | 296/97 |
| 2,634,530 | 4/1953 | Herschede et al. | 40/130 |
| 2,640,909 | 6/1953 | Montgomery | 240/4.2 |
| 2,733,763 | 2/1956 | Nygaard | 160/32 |
| 2,858,417 | 10/1958 | Stevens et al. | 240/8.16 |
| 3,159,421 | 12/1964 | Samuelson | 296/97 |
| 3,318,032 | 5/1967 | Robison et al. | 40/152.2 |
| 3,343,867 | 9/1967 | Couch et al. | 296/97 |
| 3,375,364 | 3/1968 | Marcus | 362/199 |
| 4,241,383 | 12/1980 | Shea | 362/135 |
| 4,353,592 | 10/1982 | Cziptschirsch | 296/97 B |
| 4,364,597 | 12/1982 | Viertel et al. | 296/97 H |

Primary Examiner—Stephen J. Lechert, Jr.
Attorney, Agent, or Firm—Price, Heneveld, Huizenga & Cooper

[57] ABSTRACT

A panel includes a mirror surrounded on three sides by a generally U-shaped light source for providing illumination of the mirror for use as a vanity mirror under low ambient light conditions. The panel, in one embodiment of the invention is an integral portion of a body of a visor or a panel which is slidably extended from a visor. The U-shaped light and mirror panel can be pivoted when in an extended position such that the light and mirror can be utilized while the visor is in a raised, stored position or in a lowered use position. The panel is, in one embodiment, coupled to an X-shaped bracket with the legs forming the bracket pivotally coupled to one another. One end of each leg is pivotally coupled to one of an anchoring member or the visor panel and the opposite end pivotally and slidably mounted to one of the anchoring member or the visor panel.

58 Claims, 20 Drawing Figures

VEHICLE VISOR LIGHTING APPARATUS

BACKGROUND OF THE INVENTION

The present invention relates to a lighting system for a vehicle and particularly one for use in connection with a visor or visor-like panel.

Vehicle visors for use in automobiles with lighting means have become standard equipment on or popular accessories for many automobiles. U.S. Pat. No. 4,227,241 represents an illuminated visor system in which lights are positioned on opposite sides of a mirror which includes a cover for selectively covering the mirror and lights as well as controlling the operation of the lights. In such visors, the light sources are relatively intense and lenses are provided for directing the light in a converging fashion toward the front of the mirror such that the light provides sufficient illumination for use of the mirror as a vanity mirror or provide illumination when the visor is properly adjusted for use as a map reading lamp. Since the introduction of this popular illuminated visor construction, other lighting systems have been proposed, as for example, a translucent rectangular frame surrounding a visor mirror which emits a light from the entire boundary of the mirror circumscribed by the frame.

It has been discovered that the relatively intense illumination necessary for use of an illuminated visor as a map reading light source can, under some conditions, be objectionable when used as a vanity light, particularly if the light source is directly in line with the user's pupils. Thus, a light source which encompasses the entire boundary of a mirror will for many users project light directly in line with the pupils of the eyes, thereby diminishing the desirability of such a lighting system for use as a light source for a vanity mirror.

SUMMARY OF THE PRESENT INVENTION

It has been discovered that by providing a U-shaped light source extending along the sides and bottom of a mirror mounted to a panel such as a visor or a component thereof will, when the illuminated mirror is used as a make-up mirror, provide a desirable level of illumination for use of the mirror without projecting light directly into the center of the user's eyes thereby providing an improved and pleasant lighting effect for use of the mirror under low ambient light conditions. The light can be of sufficient intensity to also serve as a map reading light.

According to one aspect of the present invention, a panel is provided with a mirror surrounded on three sides by a generally U-shaped light source for providing illumination of the mirror for use as a vanity mirror under low ambient light conditions. The panel, according to the present invention, can be an integral portion of a body of a visor or a panel which is slidably extended from a visor for use of the mirror and retracted within the body of the visor when the mirror and light is not in use. According to another aspect of the present invention, the U-shaped light and mirror panel which is slidably mounted within the body of a visor can be pivoted when in an extended position such that the light and mirror can be utilized while the visor is in a raised, stored position or in a lowered use position.

According to still a further aspect of the present invention, a visor is provided with a slide-out panel which is coupled to an X-shaped bracket with the legs forming the bracket pivotally coupled to one another. One end of each leg is pivotally coupled to one of an anchoring member or the visor panel and the opposite end pivotally and slidably mounted to one of the anchoring member or the visor panel. Such construction provides smooth and controlled sliding movement of a panel directly into or out of a visor body. Such mechanism may also include a pivot connection of the visor panel to the mounting bracket and may be used independently of the mirror and U-shaped light source.

These and other features, objects and advantages of the present invention will become apparent upon reading the following description thereof together with reference to the accompanying drawings in which:

DETAILED DESCRIPTION OF THE PREFERRED EMBODIMENTS

Figure 1:
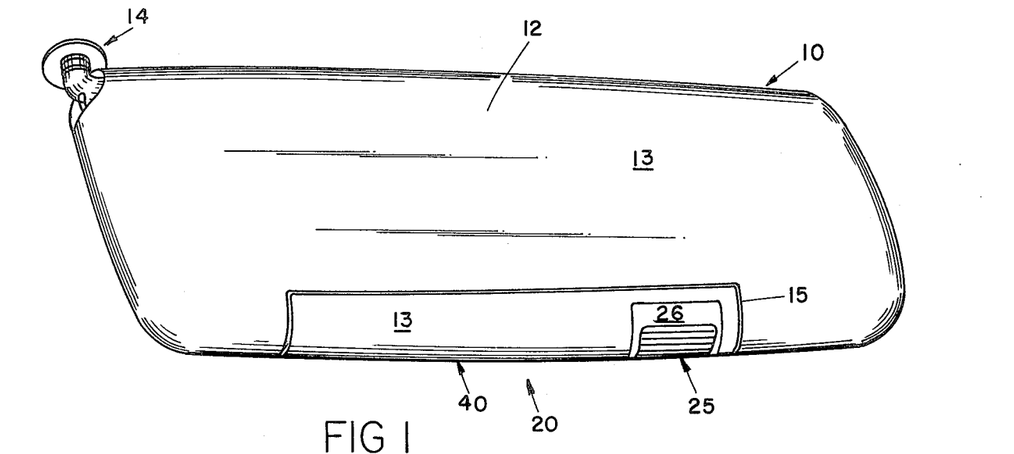
FIG. 1 is a perspective view of a visor embodying one aspect of the present invention.

Referring initially to FIGS. 1 through 5, there is illustrated a preferred embodiment of the invention comprising a visor assembly 10 which includes a visor body 12 having a internal molded polypropylene core 17 (FIG. 10) covered by a suitable upholstery material 13 to provide a finished appearance to the visor which matches the upholstery of the vehicle interior. An elbow bracket assembly 14 for mounting the visor to a vehicle extends into the core along the upper edge of the visor and can be of the type described in U.S. patent application entitled VISOR CONTROL, filed on June 28, 1982, Ser. No. 392,534, the disclosure of which is incorporated herein by reference. The visor core includes a slot 15 along the lower edge of the visor body so formed for receiving an illuminated mirror assembly 20. Slot 15 which provides recessed mounting of the lower edge of assembly 20 also extends inwardly and upwardly through the core to provide a recess receiving the assembly 20 when in a stored position, as illustrated in FIG. 1.

Figure 4:
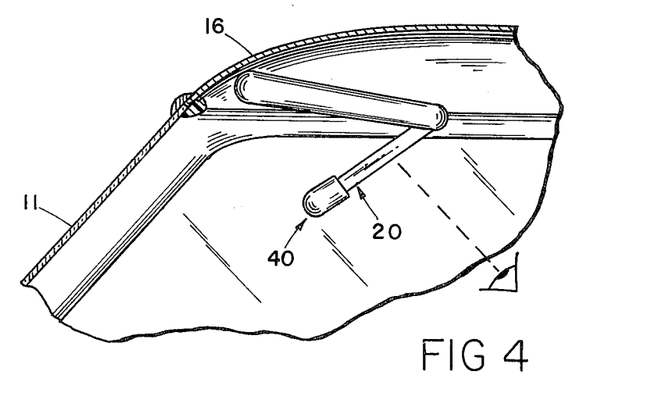
FIG. 4 is a fragmentary, left-side elevational view of the structure shown in FIG. 2 shown in a second operational position in a vehicle.
Figure 5:
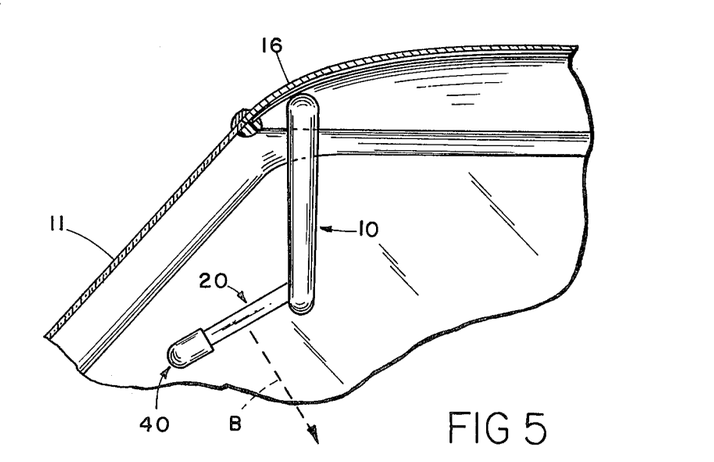
FIG. 5 is a fragmentary, left-side elevational view of the structure shown in FIG. 2 shown in a third operational position in a vehicle.

Assembly 20 which is a generally rectangular, planar, panel-like structure will be described in greater detail below. Briefly, the assembly includes a mirror 22 mounted on one side which is partly circumscribed on the left side, lower edge and right side by a generally horizontally elongated, U-shaped band of light radiating means which includes a translucent panel 24 behind which there are provided a plurality of light sources for projecting illumination outwardly and in front of mirror 22. A latch assembly 25 with an actuating door 26 selectively holds panel assembly 20 within the visor body, and upon pressing door 26 inwardly, the panel can be extended from the visor body to a lower use position, as illustrated in FIGS. 2 through 5. Panel 20 also pivots fore and aft of the visor body in a direction orthogonal to the plane of the visor body, as shown by arrow A in FIG. 2 and as illustrated in FIGS. 4 and 5. Thus, the illuminated mirror panel 20 retracts into the visor body for storage, as illustrated in FIG. 1, and extends from the visor body, as illustrated in FIGS. 2 through 5, and can be pivotally adjustable with respect to the visor body to a variety of operational positions.

Figure 2:
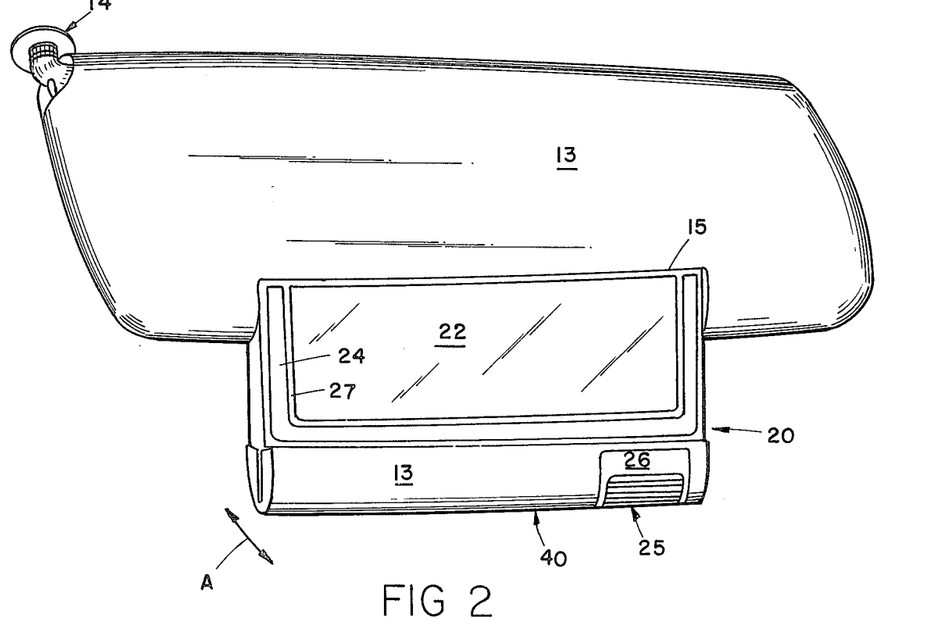
FIG. 2 is a perspective view of the structure shown in FIG. 1 with a lighted mirror panel shown in an extended position.
Figure 3:
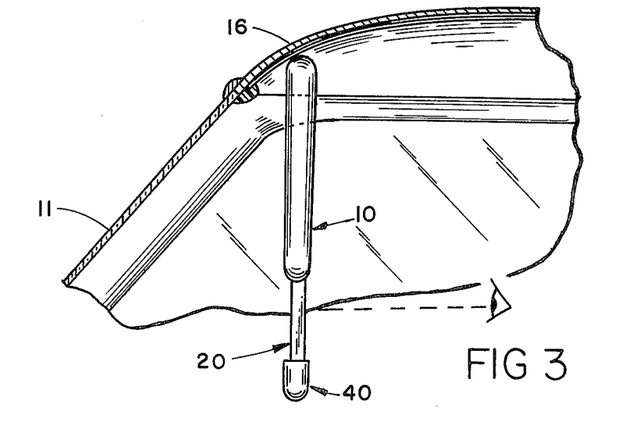
FIG. 3 is a fragmentary, left-side elevational view of the structure shown in FIG. 2 shown in a first operational position in a vehicle.

In FIGS. 2 and 3, visor 10 is shown in a lowered, generally vertically extending position with panel 20 extending downwardly such that the upper portion of the mirror 22 will be approximately at eye-level with the U-shaped lighting means projecting light outwardly in a manner to frame the face of the user with light for use of the vanity mirror under low ambient light conditions. FIG. 4 illustrates the use of the lighted mirror panel 20 with the visor 10 being in a raised or stored position generally adjacent the roof and headliner 16 of the vehicle. In this position, panel 20 is pulled from the visor body and pivoted downwardly to a use position, as shown. Naturally, the user must look upwardly for use of the visor in this position, however, again the pivoted adjustability of panel 20 as well as the visor body permits the visor to be used without lowering and in a manner such that the U-shaped light provides illumination for use of the mirror as a vanity mirror.

FIG. 5 illustrates the use of the visor assembly 10 as a map reading light in which case the visor body is lowered to a generally vertically extending position with the illuminated panel 20 pivoted forwardly toward the windshield 11 of the vehicle. In this position, light from the U-shaped lighting means is projected downwardly and rearwardly, as indicated by arrow B, toward the lap of the user to provide illumination for reading maps or generally providing illumination in the lap area of the occupant in front of the visor. Assembly 20 is slidably mounted within the visor core 17 (FIG. 10) by a pivoted slide assembly 90, shown in FIGS. 9 and 10. The illuminated mirror panel assembly 20 is best seen in FIGS. 6, 7, 9 and 13 and is now described in detail.

Figures 6, 7, 8, 11, 12:
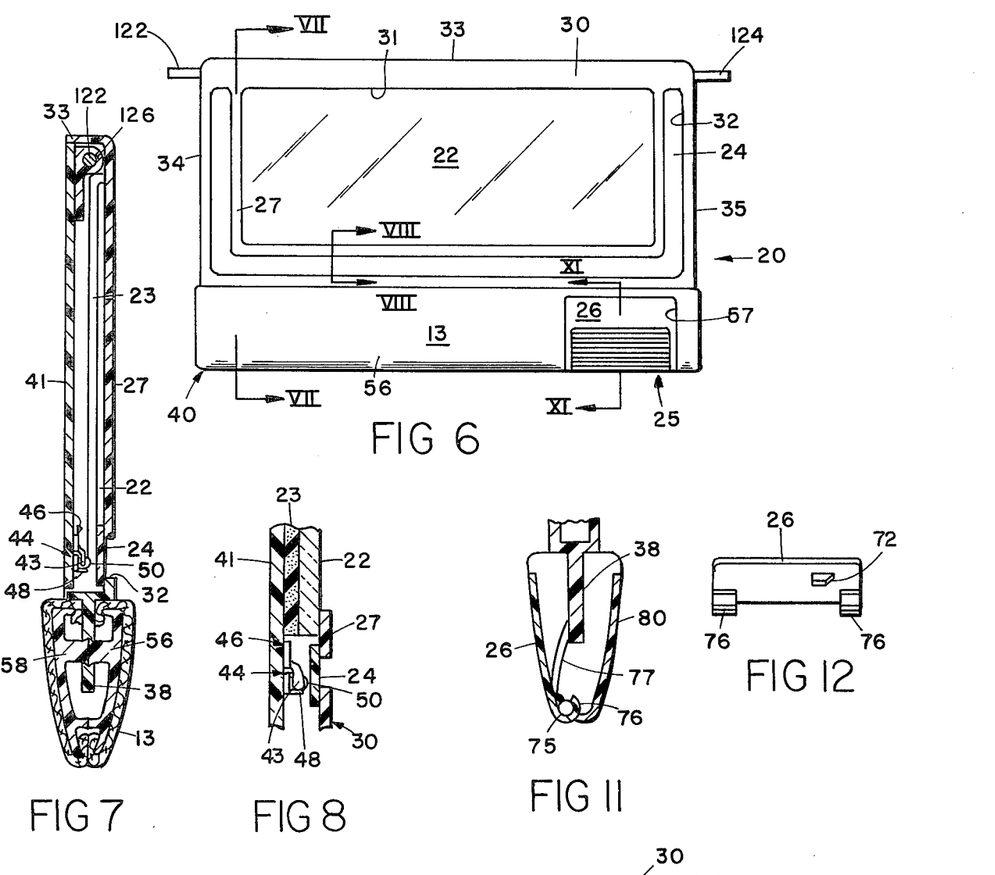
FIG. 6 is an enlarged, front elevational view of the mirror panel shown in FIGS. 1 and 2.
FIG. 7 is an enlarged, cross-sectional view of the structure shown in FIG. 6 taken along section line VII—VII of FIG. 6.
FIG. 8 is a fragmentary, enlarged, cross-sectional view of a portion of the structure shown in FIG. 6 taken along section line VIII—VIII of FIG. 6.
FIG. 11 is an enlarged, cross-sectional view of a portion of the structure shown in FIG. 6 taken along section line XI—XI of FIG. 6.
FIG. 12 is a perspective view of the inside of the latch release door shown in FIGS. 11 and 13 taken in a direction indicated by line XII—XII of FIG. 13.

Assembly 20 includes a front panel 30 having a large rectangular aperture 31 for exposing the reflective surface of mirror 22, secured to the rear surface of panel 30, by conventional means such as bonding adhesives around the periphery of the mirror 22 or by integrally molded brackets into which the mirror is fitted. As best seen in FIG. 8, mirror 22 is backed by a foam layer 23. The face of panel 30 also includes an elongated, U-shaped slot 32, extending in spaced relationship around only three sides of mirror 22. Slot 32 thus extends from the top left edge of aperture 31 (as viewed in FIG. 6) down along the left edge and continuously along the bottom and upwardly to the top edge of the right side to define a U-shaped slot having an elongated base leg positioned below the mirror 22. Positioned behind slot 32 and secured by conventional means, such as bonding adhesives or integrally molded brackets, is a light transmissive panel 24.

Panel 24, in the preferred embodiment, is a light translucent material such as milky-white colored polycarbonate or clear material having an interior surface which is either frosted or pebble grained to facilitate the dispersion of light throughout the panel 24 from the point light sources, described below, which are positioned behind panel 24 at a distance of up to 0.060 inches. Panel 24 has a light transmissivity of from 50% to 90% and a thickness of about 0.060 inches. In the preferred embodiment, the width of the exposed portion of the U-shaped light source defined by panel 24 was about 3/8 inches, and the width of the boarder 27 of panel 30 between panel 24 and mirror 22 was about 3/16 inches.

Panel 30 includes a rearwardly extending top wall 33, left and right sidewalls 34 and 35, each of which includes a slot 36 near the top thereof, permitting pivot rods 122 and 124 to extend outwardly from the mirror assembly. The front panel 30 also includes a lower wall 37 (FIG. 13) which includes a blade 38 of material extending outwardly therefrom to provide means for attaching a handle assembly 40 thereto. The right edge of blade 38 integrally includes a latch socket 60, described in greater detail below. The integrally molded front panel 30, made of polycarbonate in the preferred embodiment, thus defines a housing for enclosing not only the mirror 22 and light transmissive panel 24, but also the light source comprising the electrical conductors and light bulbs positioned behind panel 24.

Figure 9:
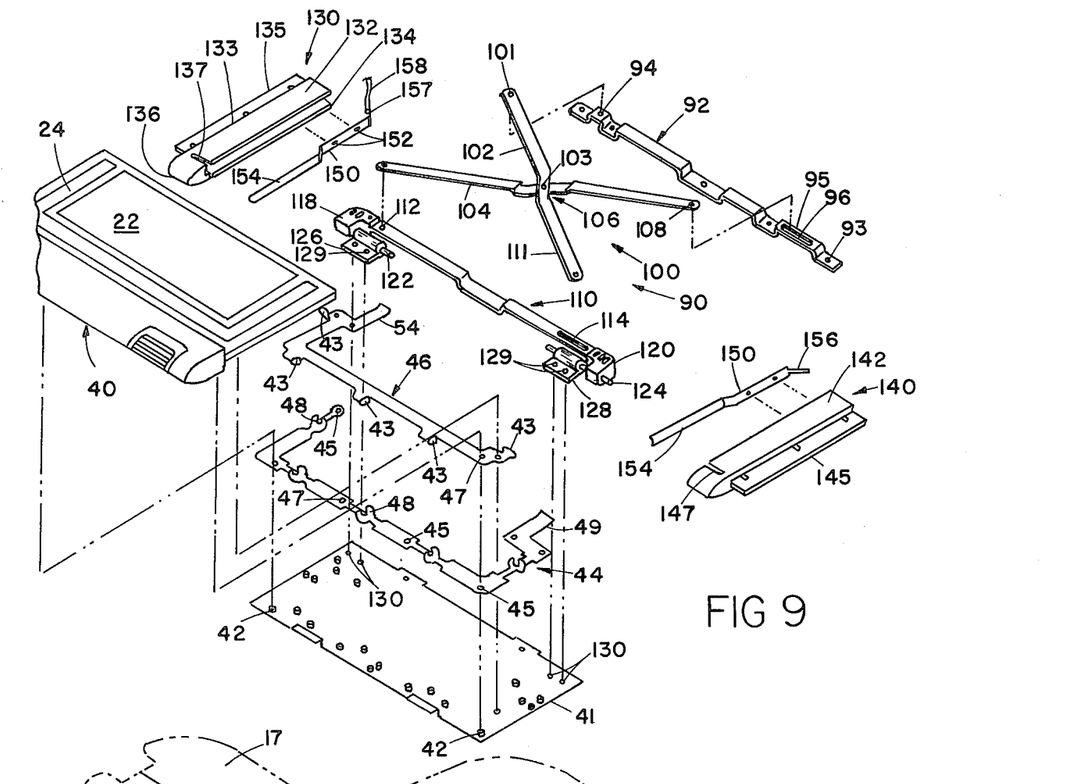
FIG. 9 is a fragmentary, exploded view of the mirror panel and the mounting mechanism for mounting the panel to a visor body.
Figure 10:
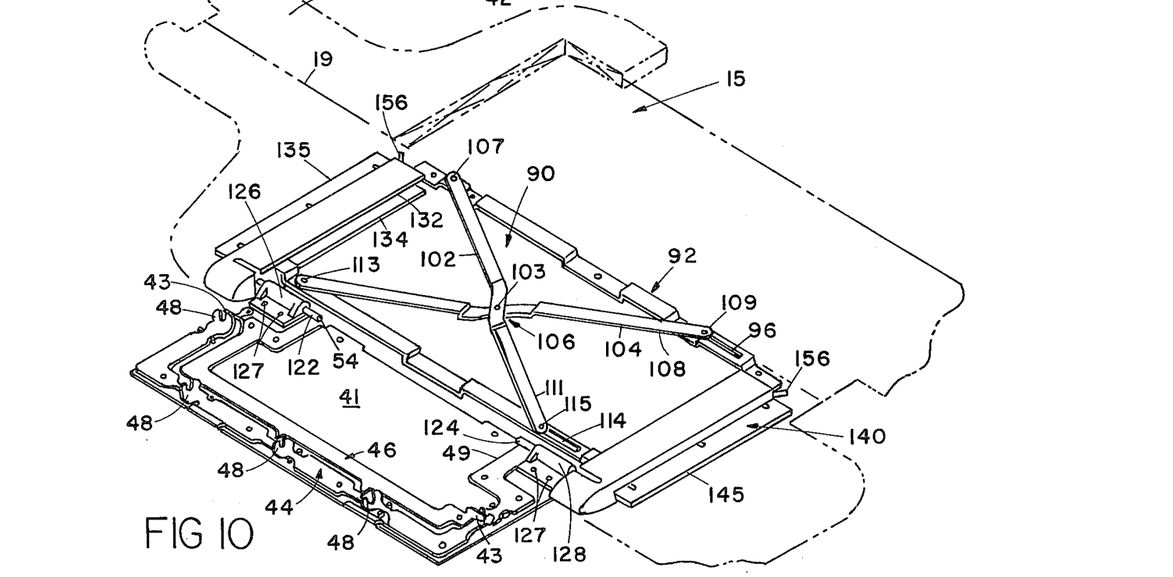
FIG. 10 is a perspective, assembled view of a portion of the structure shown in FIG. 9 showing the visor core in phantom form.

Covering the rear of the housing defined by the front panel 30 is a rear closure panel 41 having a plurality of upwardly extending posts 42 for securing thereto in spaced relationship, a pair of flat stamped electrical conductors 44 and 46 (FIGS. 9 and 10). Conductor 44 is generally U-shaped and made of a strip of conductive material and includes a plurality of apertures 45 which fit over and are secured to posts 42 to position the conductor on cover 41. Extending along the U-shaped conductor 4 are, in the preferred embodiment, five integrally formed, upwardly extending U-shaped clips 48, with one clip being formed on each of the side legs of the U-shaped conductor, and three, equally spaced clips 48 extending along the bottom leg of the U-shaped conductor. At the upper right corner of conductor 44, there is provided a leaf slip-ring-type contact 49 for making electrical contact with the electrically conductive pivot rod 124 associated with the slide assembly 90.

Figure 9A:
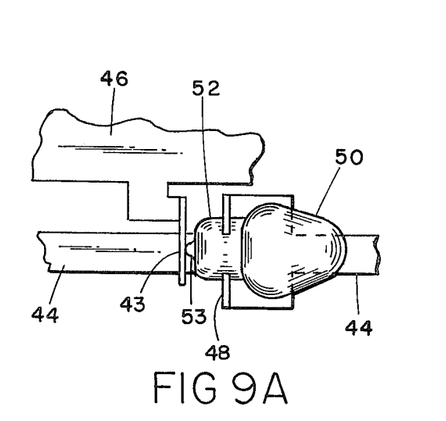
FIG. 9A is an enlarged, fragmentary, top plan view of one of the bulb sockets shown in FIGS. 9 and 10 shown with a bulb inserted therein.

Electrical conductor 46 also includes a plurality of apertures 47 for mounting to posts 42 on back plate 41 and five upwardly extending, off-set, L-shaped electrical contacts 43 (FIG. 9A) for engaging the rear terminal of a conventional bayonet bulb 50 fitted within U-shaped clips 48. When assembled, the insulative back plate 41 made of a polycarbonate material supports, as best seen in FIG. 10, conductors 44 and 46 in spaced relationship, and posts 42 are heat staked to secure the conductors in place. The corresponding aligned clips 48 and contacts 43 of the electrical contacts define an electrical socket for each of five bayonet light bulbs employed. Thus, as best seen in FIG. 9A, which illustrates one of the sockets, a conventional bayonet-type light bulb 50, such as a type 336, having a cylindrical portion 52, will snap-fit within the socket 48 which securely, mechanically holds the bulb in position. The end contact 53 of bulb 50 engages the upwardly extending contact 43 of conductor 46 which includes a slip-ring contact 54 engaging the other electrically conductive pivot rod 122, as best seen in FIG. 10, such that electrical power can be simultaneously applied to each of the five bulbs mounted to the electrical contact assembly. Before describing the mounting of the mirror assembly 20 to the slide assembly 90, a description of the handle assembly 40 and latch means 25 is now provided with initial reference to FIG. 13.

The handle assembly 40 includes an upper trim piece 56 and a lower trim piece 58 each integrally molded of a suitable polymeric material such as polycarbonate and each including a notch 57. The trim pieces 56 and 58 are snap-fitted to, overlie, and sandwich the blade 38 and latch socket 60 therebetween, as best seen in FIG. 7. The upholstery fabric 13 is also extended over the handle assembly to conform the handle's appearance to that of the visor body.

Figure 13:
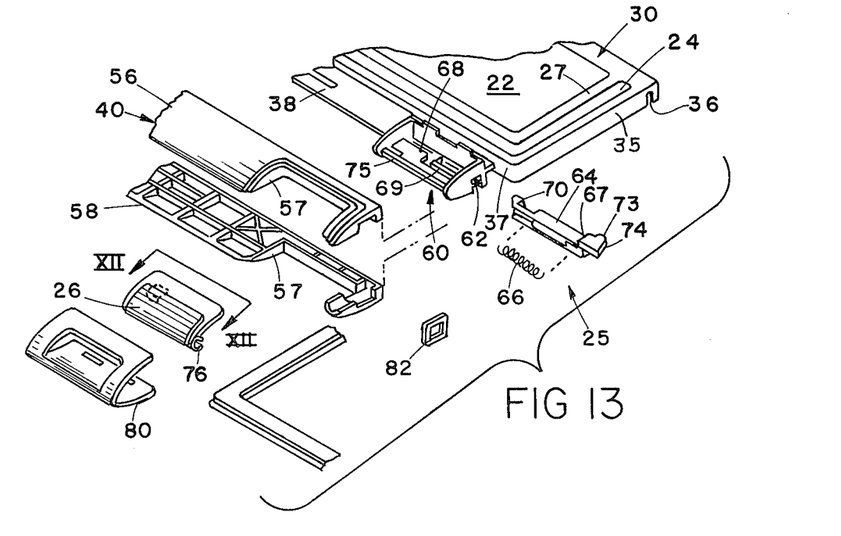
FIG. 13 is a fragmentary, exploded view of the latch mechanism shown partly in FIGS. 11 and 12.

The latch assembly 25 includes the socket assembly 60 integrally formed within the front panel 30 and which includes an H-shaped recess 62 extending inwardly from the right edge thereof for receiving a similarly configurated latch pin 64, as best seen in FIG. 13. The latch pin 64 thus slides in and out of the latch socket assembly 60 along recess 62 and is urged in an outward direction by a compression spring 66 engaging wall 67 of latch pin 64 at one edge and wall 68 at the end of a spring receiving recess 69 of socket 60 at its other end once the pin has been positioned within slot 62. Latch pin 64 includes an inclined camming surface 70 which cooperates with an inclined cam surface 72 of door 26, as described below, to urge the latch pin in an inward, retracted position within socket 60 permitting sliding of the illuminated mirror assembly 20 outwardly from the visor body. The right side bracket 140 (FIG. 9) of the slide assembly includes a rectangular aperture formed therein and aligned with the latch pin 64 when assembly 20 is in a retracted position, as shown in FIG. 1, for receiving the end 74 of latch pin 64 for holding the slide in a retracted position within the visor body.

Door 26 is snap-fit to a circular pin 75 of latch socket 60 by means of semicircular, polymeric sockets 76 at opposite edges of the door. A leaf spring 77 (FIG. 11) urges door 26 in a closed, flush position with a bezel member 80 which snap-fits within sockets 57 formed in trim pieces 56 and 58.

The right edges of trim pieces 56 and 58 include rectangular slots, as seen in FIG. 13, permitting the latch pin 64 to move freely with respect to these members, and a decorative bezel 82 covers the end of the handle means and is attached thereto in a conventional manner as is bezel 80.

Camming member 72 is positioned on the inner surface of door 26, as best seen in FIG. 12, such that as door 26 is pushed inwardly against the compression spring 77, camming surface 72 engages camming surface 70 to retract pin 64 within latch socket 60 thereby pulling end 74 from the slot in the slide assembly, allowing the illuminated mirror assembly 20 to be extended from the visor body. The upper edge 73 of end 74 of the latch pin is curved to permit the retraction of the assembly 20 into the visor body while urging pin 64 inwardly until it aligns with the locking slot whereupon spring 66 urges the pin into a locking position to hold assembly 20 in a retracted, stored position within the visor body. Having described the handle assembly which facilitates the extension and retraction of the illuminated mirror assembly from the visor body, a description of the slide mechanism securing the illuminated mirror assembly within the visor core is described in connection with FIGS. 9 and 10.

The slide assembly 90 for mounting mirror assembly 20 within the core of visor 10 includes an anchor bracket 92 which is secured to the core 17 by suitable fastening means such as heat stake posts integrally formed with the core and secured within apertures 93 formed on bracket 92. The bracket includes at least two upwardly extending lands including a first land 94 for pivotally receiving one leg 102 of an X-shaped bracket 100 having a second leg 104 pivotally coupled to leg 102 at their cross-over points by means of a pivot pin 103. End 101 of leg 102 is pivotally coupled to land 94 by means of a pivot pin such as a loosely fitted rivit 107 (FIG. 10). Bracket 92 also includes an elongated land 95 at an end opposite land 94 which includes a slot 96 formed therein for pivotally and slidably receiving an end 108 of leg 104 which is pivotally and slidably coupled to slot 96 by means of a pivot pin 109 (FIG. 10) which extends through an aperture in the end of leg 104 into slot 96 and permits end 108 of leg 104 to pivot with respect to bracket 92 as well as slide along slot 96. In some embodiments of the invention, the mounting bracket 92 may be an integrally formed portion of the core 17 or be a stamped metal member, as illustrated in the preferred embodiment.

The opposite end of legs 102 and 104 of X bracket 100 are pivotally and slidably, respectively, mounted to a movable bracket 110 which includes an aperture 112 near one end for pivotally receiving the end of leg 104 opposite end 108. A pivot pin 113 pivotally couples this end of leg 104 to aperture 112 of bracket 110. The end of leg 102 opposite aperture 101 is pivotally and slidably fitted within bracket 110 in a slot 114 formed near the right end of the bracket by means of a pivot pin 115 such that this end of leg 102 can pivot and slide with respect to bracket 110. This mounting arrangement, by which the left ends of the X bracket 100 are pivotally mounted between brackets 92 and 110, and the right ends are pivotally and slidably mounted to brackets 92 and 110, permit the collapsing of the X bracket 100 within the rectangular space defining the recess or slot 15 of the visor core when the light panel 20 is retracted within the body of the visor, and the extension of the panel, as illustrated in the fragmentary view of FIG. 10, in which ends 108 and 111 of the X bracket slide to the left within slots 96 and 114. Naturally, in the contracted position, these ends slide to the right in the slots as the X-shaped bracket collapses. The center of the legs 102 and 104 are off-set at 106, as illustrated in FIGS. 9 and 10, to provide clearance in their collapsed position.

The ends of bracket 110 include integrally molded, generally L-shaped slide caps 118 and 120 through which the conductive pivot rods 122 and 124 extend, respectively. Pivot rods 122 and 124 also extend through molded on torque hinges 126 and 128 each including a pair of spaced apertures 129 for securing the hinges so formed to rear panel 41 of the visor assembly, as illustrated in FIGS. 9 and 10. The hinges so formed can be secured to panel 41 by suitable fastening screws 127 which extend through apertures 130 formed in plate 40 or by other conventional fastening means. The molded on hinges 126 and 128 can be made of the same material to achieve the same results as the molded on torque devices disclosed in U.S. Pat. No. 4,352,518, the disclosure of which is incorporated herein by reference. The purpose of the torque fitting hinges 126 and 128 is to permit the illuminated mirror assembly 20 to be adjusted to any desired position, as illustrated in FIGS. 4 and 5 and maintain such adjusted position until manually moved to a desired different position. To anchor the pivot pins 122 and 124 against rotation, the pins can be knurled or include flanges which are fitted into end caps 118 and 120 to anchor the pins against rotation with respect to bracket 110 and permit the rotational innerface to take place within the body of hinges 126 and 128 secured to assembly 20 by rear panel 40. Pins 122 and 124 extend inwardly facing each other to the inside edges of hinges 126 and 128 a distance sufficient to engage slip-ring contacts 54 and 49 of conductors 46 and 44, respectively, as illustrated in FIG. 10, and extend outwardly from the sides of front panel 30 of panel assembly 20, as best seen in FIG. 6, to provide electrical contact with the side bracket assemblies 130 and 140 now described.

Each of the assemblies 130 and 140 are substantially identical such that a description of only one is provided in detail with same elements carrying the same less significant reference digit. Assembly 130, for example, is a generally elongated U-shaped member having upper and lower legs 132 and 134 defining a slot therebetween and a rear wall 133 from which there extends a blade 135 for securing the side bracket assemblies within the core 17 of the visor. The lower end of the bracket includes a tapered, blunt nose 136 to conform the bracket to the lower configured edge of the visor. The upper leg 132 includes a slot 137 formed therein to facilitate assembly of the illuminated panel assembly 20 therein by permitting pivot rods 122 and 124 to be extended into slots 137 and 147 during assembly. The spacing of legs 132 and 134 and 142 and 144 permit the mounting of an electrical conductor strip 150 therein which is secured within the brackets 130 and 140 by means of a pair of apertures 152 and suitable fastening means such as screws. The lower end of each of the conductors 150 is bent to extend inwardly toward the center of the visor and provide an electrical contact 154 which will engage the end of the respective electrically conductive pivot pins 122 and 124 once the slide assembly is moved from the upward, stored position to a lowered, use position. Thus, the upper portion of each conductor 150 provides clearance such that the ends of pins will not contact these electrical contacts while the lower contact portion 154 will contact the pivot pins once the slide has been lowered to thereby supply electrical operating power through pins 122 and 124 through electrical conductors 46 and 44, respectively, and subsequently to the light bulbs 50 mounted therein automatically when the illuminated mirror assembly is extended from the visor body. The upper ends of conductors 150 include a lug 156 for receiving a conventional snap-on terminal 157 coupled to an electrical wire 158 for each of the contacts which wires extend through the upper portion of the visor core through elbow bracket assembly 14 to the vehicle's operating power system.

The panel assembly 20 and the slide assembly 90 are positioned within the molded polypropylene core 17, which is shown schematically in phantom form in FIG. 10, and which comprises a pair of core halves joined along a living hinge 19. The core is fabricated in a manner similar to that disclosed in U.S. Pat. No. 4,000,404, the disclosure of which is incorporated herein by reference, with the exception that slot 15 is shaped to accomodate the slide assembly 90 including end bracket assemblies 130 and 140.

Once the illuminated mirror assembly 20 has been assembled, it is positioned within the side slide brackets 130 and 140 with end caps 118 and 120 sliding between and guided by walls 132 and 134 of bracket 130 and 142 and 144 of bracket 140 to provide smooth sliding and support for the movement of the illuminated panel assembly into and out of the visor body. The core halves 17 are then closed and the core is sealed by heat staking, bonding or other conventional means to hold the assembly in position with the upholstery fabric covering the core and the noses 136 and 146 of the end bracket assemblies, as well as the handle means 40 of the illuminated mirror assembly. The light bulbs, in the preferred embodiment of the invention, were approximately 0.7 of a candle power to provide a total of 3.5 candle powers of illumination through the generally U-shaped light transmitting panel 24. In other embodiments of the invention, larger or smaller bulbs may be employed and the surfaces of conductors 44 and 46 may be plated to be highly reflective to assist in the projection of illumination from lamps outwardly through panel 24. Naturally, conductors 44 and 46 are shaped to position and align the bulbs directly behind U-shaped panel 24 with the bulbs being generally vertically positioned at the center of the side legs and the three bulbs along the lower leg being positioned at the center and midway between each of the sides of the lower leg of panel 24. A greater or fewer number of sockets can be formed in conductors 44 and 46 to increase or decrease the illumination, and a bright/dim switch may be provided in connection with a conventional electrical circuit to increase or decrease the amount of current supplied to the bulbs for increasing or decreasing, respectively, the amount of illumination provided by such bulbs.

Figure 18:
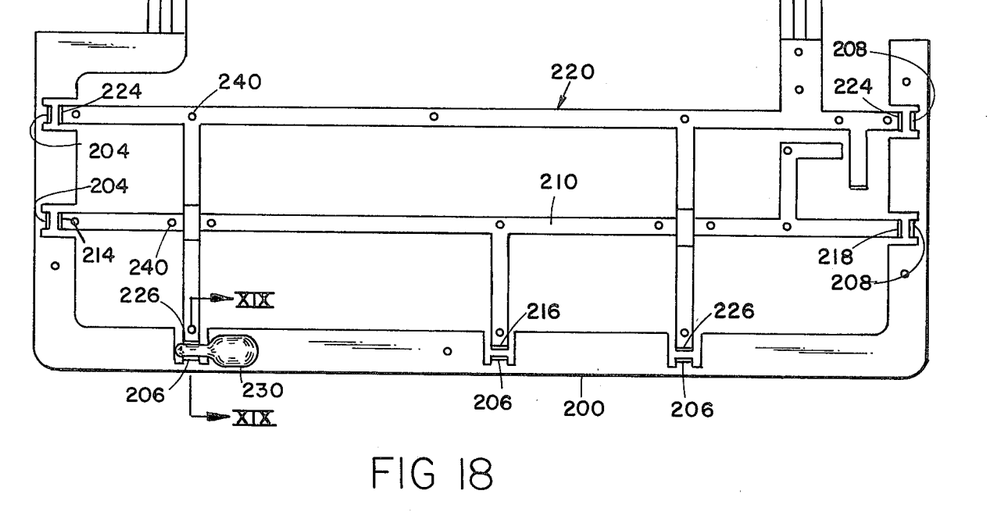
FIG. 18 is a front elevational view of an alternative embodiment of the electrical contacts for the present invention.

In an alternative embodiment of the electrical conductors, which can be used with the system of the present invention, FIG. 18 shows a system by which bright and dim levels of illumination can be provided by activating a greater or fewer number of light bulbs. In FIG.

18, three electrical conductors 200, 210 and 220 are provided with conductor 200 being a stamped metal conductive material and generally U-shaped. Conductor 200 includes a pair of leaf contacts 202 at one end which cooperate with pin 122 (FIG. 9) for providing the common electrical conductor for the lamp circuit. Electrical conductor 200 also includes on its left leg a pair of vertically spaced upstanding terminals 204 which cooperate with mating terminals on conductors 210 or 220 for physically holding wedge-type bulbs, which are commercially available No. 74 bulbs, in place behind the U-shaped panel 24 (FIG. 9).

Figure 19:
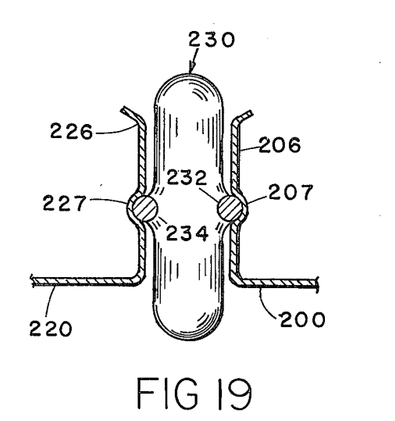
FIG. 19 is an enlarged, cross-sectional view of a portion of FIG. 18 taken along section line XIX—XIX of FIG. 18.

The bottom leg of conductor 200 includes three equally spaced contacts 206 while the right leg includes a pair of spaced contacts 208. Each of these legs are upwardly turned and, as seen in FIG. 19, include an indentation 207 for receiving the wire conductor 232 of the bulb 230 in physical and electrical contact.

Conductive strip 220 also includes a leaf contact 222 which engages supply voltage pin 124 (FIG. 9) for supplying operating current to the electrically conductive strip 220. Strip 220 also includes a pair of upwardly turned ends 224 along an upper leg which are aligned with an form the opposite contact for the wedge base bulb 230 in cooperation with upper contacts 204 and 208 of contact strip 200. Contacts 224 and the remaining contacts includes a recess 227 therein for receiving the remaining electrical wire 234 of bulb 230 for supplying operating power thereto. Conductor 220 also includes a pair of generally vertically extending legs, as seen in FIG. 18, which define contacts 226 for a pair of spaced bulbs along the lower leg of the generally U-shaped light provided by the system.

A high intensity illumination conductor 210 is positioned intermediate low light level conductor 220 and camming conductor 200 and similarly includes a pair of contacts 214 and 218 on opposite ends thereof which cooperate and are aligned with contacts 204 and 208 of the common conductor 200 to provide a physical socket for the wedge-based bulbs. Contact strip 210 also includes a center leg with a contact 216 cooperating with the center contact 206 of strip 200 for providing a bulb receiving socket in cooperation therewith.

Each of the conductors 200, 210, and 220 include a plurality of apertures 240 spaced at various locations therealong for securing them to the insulative backing panel 41 of the mirror assembly by, for example, heat staking the conductors in the relative position, illustrated in FIG. 18. A slide switch (not shown) couples conductor 220 to conductor 210 when in the high intensity position. Voltage applied to contact 222 will be applied to conductor 220 in the low position for illuminating four light bulbs 230, one on each of the legs and two on lower leg of the U-shaped light source, when the switch is closed to apply power from contact 222 to both conductors 220 and 210, three additional light bulbs with one on either side and one centrally located on the bottom are activated such that in the high intensity position, seven lamps are illuminated. With the system illustrated in FIGS. 18 and 19, therefore, upper and lower levels of illumination are provided by selectively activating a greater or fewer number of lamps, and the wedge-shaped bulbs which have a candle power of approximately 0.7 for each bulb will provide a total illumination of 4.9 candle power in the high intensity position and 3.5 candle power in the lower level of illumination.

The mirror and light package contained within assembly 20 can also be placed in a variety of other shaped visor bodies or panels positioned within the interior of a vehicle to provide the desired U-shaped light source surrounding a mirror to provide illumination for the use of a mirror or for other light source applications. In an alternative embodiment, shown in FIG. 14, a panel 160 is shown in the preferred embodiment as being a conventional visor body although the panel may form a portion of a vehicle headliner, dashboard or other panel, movably or stationarily attached to the interior of a vehicle. Panel 160 is, however, a visor body including a core 164, as shown in FIG. 15, which accomodates a mirror panel 22 and the U-shaped light panel 24 with the light sources and electrical contact assembly illustrated in FIGS. 9 and 10 or 17 and 18 being positioned within the body of the core 164. A bright/dim switch 166 is provided and is electrically coupled in a conventional electrical circuit to provide adjustable illumination from the light panel 24 as desired.

Figures 14, 16:
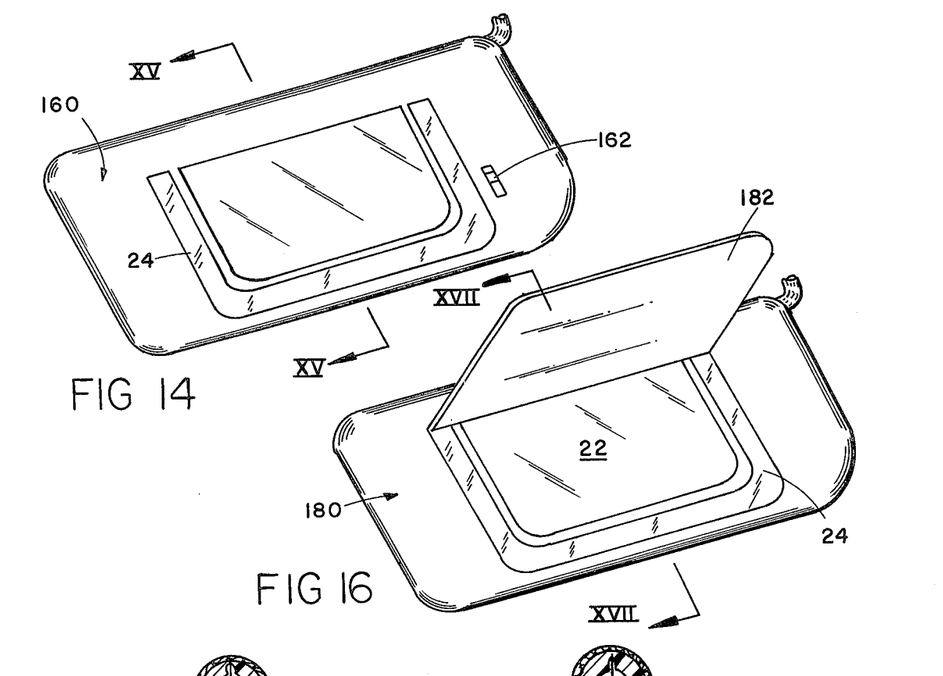
FIG. 14 is a perspective view of an alternative embodiment of the present invention.
FIG. 16 is a perspective view of an alternative embodiment of the present invention.
Figures 15, 17:
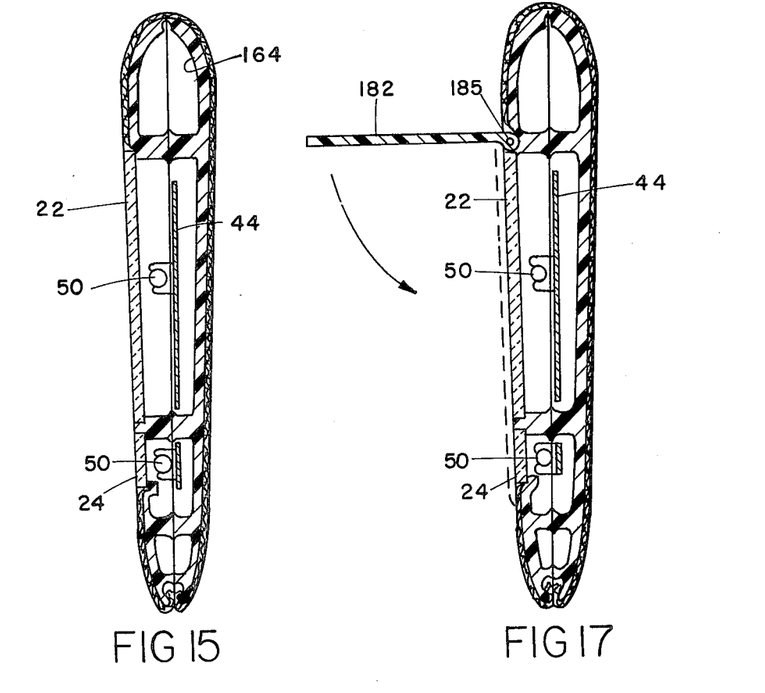
FIG. 15 is an enlarged, cross-sectional view of the structure shown in FIG. 14 taken along section line XV—XV of FIG. 14.
FIG. 17 is an enlarged, cross-sectional view of the structure of FIG. 16 taken along section line XVII—XVII of FIG. 16.

In yet another embodiment of the invention, a covered illuminated visor is provided, as illustrated in FIG. 16, in which a visor 180 includes a cover 182 pivotally coupled to the visor employing a pivot mechanism 185, illustrated schematically in FIG. 17, but which can be of construction identical to that disclosed in U.S. patent application entitled VISOR COVER ASSEMBLY, filed on Feb. 7, 1983, Ser. No. 464,476, the disclosure of which is incorporated herein by reference. Visor 180 also includes a mirror and U-shaped light emitting panel 24 with the lamp means arranged behind panel 24 and actuated by the opening of cover 82 to project illumination outwardly from the panel 24 when cover 182 is moved to an open position, as illustrated in FIGS. 16 and 17. The closing of the cover operates the switch coupled to the lamps for extinguishing the lamps when the cover extends over panel 24 and mirror 22.

It will become apparent to those skilled in the art that various modifications to the preferred embodiments of the invention, disclosed herein, can be made without departing from the spirit or scope of the invention as defined by the appended claims.

The embodiments of the invention in which an exclusive property or privilege is claimed are defined as follows:

1. An automotive visor comprising:
   a visor body including slot means formed along a lower edge thereof and extending within said visor body for receiving a slide-out panel;
   means for mounting said visor body to a vehicle for movement between a raised stored position and a lowered use position;
   a panel shaped to fit within said slot of said visor body;
   means for slidably mounting said panel to said visor body for movement between a stored position within said visor body and a use position extended from said visor body; and
   means for pivotally mounting said panel to said second named mounting means to permit said panel to be adjustably pivoted on an axis parallel to said visor body and adjacent a lower edge of said visor body when in an extended position.

2. The apparatus as defined in claim 1 and further including latch means mounted to said panel for releasably holding said panel in said stored position.

3. The apparatus as defined in claim 2 wherein said means for slidably mounting said panel includes a pair of spaced guide means positioned in said visor body and extending along opposite sides of said panel.

4. The apparatus as defined in claim 3 wherein said means for slidably mounting said panel further includes a movable slide including ends guidably supported by said guide means.

5. The apparatus as defined in claim 4 wherein said means for pivotally mounting said panel includes hinge means extending between said movable slide and said panel.

6. The apparatus as defined in claim 5 wherein said means for slidably mounting said panel further includes an X-shaped bracket defined by two legs pivotally coupled to each other where the legs cross and wherein one end of each leg is pivotally coupled to one of said visor body or movable slide and the other end of each leg pivotally and slidably coupled to the other of said visor body or movable slide such that said panel is stabilized in its movement between a stored position within said visor body and a use position extended from said visor body.

7. An automotive visor comprising:
a visor panel; and
means for mounting said panel to a vehicle, said mounting means including an X-shaped bracket defined by two legs pivotally coupled to each other where the legs cross and wherein one end of each leg is pivotally coupled to one of said visor panel or the vehicle and the other end of each leg is pivotally and slidably coupled to the other of said visor panel or the vehicle such that said body is stabilized in its movement between a stored position and an extended use position.

8. The apparatus as defined in claim 7 wherein said mounting means further includes a pair of spaced guide means extending on opposite sides of said panel in a direction of movement of said panel to guide and support said panel.

9. The apparatus as defined in claim 8 and further including latch means mounted to said panel for releasably holding said panel in a stored position.

10. The apparatus as defined in claim 9 and further including mirror means mounted on said panel for use by an occupant when said panel is in a use position.

11. The apparatus as defined in claim 10 and further including light means mounted to said panel for directing illumination outwardly therefrom for use of said mirror under low ambient light conditions.

12. The apparatus as defined in claim 11 wherein said light means defines a continuous U-shaped source of illumination extending adjacent the sides and bottom of said mirror.

13. The apparatus as defined in claim 7 and further including light means mounted to said panel for directing illumination outwardly therefrom.

14. A lighting panel for the interior of a vehicle comprising:
panel means including a U-shaped recess formed therein for receiving light means for projecting illumination outwardly from said panel from a generally continuous U-shaped pattern;
light means mounted to said panel means in alignment with said recess;
a U-shaped cover for said recess which is light transmissive such that illumination from said light means will appear to be emitted from a planar U-shaped source;
and
means for mounting said panel means to a vehicle.

15. The apparatus as defined in claim 14 and further including a mirror positioned on said panel to be partially circumscribed by said U-shaped light source.

16. The apparatus as defined in claim 15 wherein said mounting means includes hinge means for pivotally mounting said panel to a vehicle.

17. An illuminated mirror assembly for use in a vehicle comprising:
a mirror panel including a U-shaped recess formed therein;
light means positioned in said recess to define a U-shaped lighting pattern;
mirror means mounted to said panel to be partially circumscribed by said light means; and
means for mounting said panel in a vehicle to position said mirror for use by an occupant as a vanity mirror.

18. The apparatus as defined in claim 17 wherein said recess extends adjacent the sides and bottom of said mirror means.

19. The apparatus as defined in claim 18 wherein said light means includes a plurality of lamps positioned in spaced relationship behind said panel in alignment with said recess, and a light transmissive panel covering said recess for dispersing light from said lamps.

20. An illuminated automotive vanity comprising:
a front panel including a generally rectangular mirror mounted thereto said front panel including a U-shaped recess extending in spaced relationship around the sides and a bottom edge of said mirror;
a light transmissive panel mounted to said front panel to cover said U-shaped recess;
a rear cover panel mounted in spaced relationship to said front panel;
electrical conductor means extending between said front and rear panels and adapted to be coupled to a source of operating power associated with the vehicle;
light means coupled to said conductor means and positioned behind said light transmissive panel for directing illumination outwardly therefrom; and
means for mounting said vanity to a vehicle for use by an occupant.

21. The apparatus as defined in claim 20 wherein said conductor means comprise strips of conductive material shaped to define sockets for said light means.

22. An illuminated visor comprising:
a visor body for mounting to a vehicle for movement between a raised stored position and a lowered use position;
a generally rectangular mirror mounted to said visor body; and
light emitting means mounted to said visor body adjacent said mirror and extending continuously along only the side and bottom edges of said mirror for providing illumination of the area in front of said mirror under low ambient light conditions.

23. The apparatus as defined in claim 22 and further including cover means pivotally coupled to said visor body for movement between a closed position covering said mirror and an open position exposing said mirror for use.

24. The apparatus as defined in claim 22 wherein said light emitting means includes a U-shaped recess formed in said visor body, a plurality of lamps positioned within said recess in spaced relationship to each other and a U-shaped light diffusion panel positioned over said recess for diffusing light from said lamps.

25. The apparatus as defined in claim 24 wherein said light emitting means further includes a pair of conductive strips positioned behind said diffusion panel and shaped to define sockets for said lamps.

26. A visor for a vehicle comprising:
   a visor body having a slot formed therein from an edge of said body for receiving a panel;
   a generally rectangular panel including U-shaped illumination means extending adjacent three edges thereof; and
   means for mounting said panel to said visor body for movement between a retracted position within said visor body and an extended position.

27. The apparatus as defined in claim 26 wherein said illumination means includes a U-shaped recess formed in said panel adjacent the sides and bottom thereof, a light transmissive panel covering said recess, and a plurality of spaced lamps positioned behind said light transmissive panel.

28. The apparatus as defined in claim 27 wherein said illumination means further comprises a pair of spaced electrical conductive strips extending behind said panel and formed to define a plurality of sockets for receiving said bulbs.

29. The apparatus as defined in claim 26 wherein said means for mounting said panel to said visor body includes an X-shaped bracket defined by two legs pivotally coupled to each other where the legs cross and wherein one end of each leg is pivotally coupled to one of said visor body of said panel and the other end of each leg pivotally and slidably coupled to the other of said visor body or said panel such that said panel is stabilized in its movement between a stored position within said visor body and a use position extended from said visor body.

30. The apparatus as defined in claim 29 and further including latch means mounted to said panel for releasably holding said panel in said stored position.

31. The apparatus as defined in claim 30 wherein said means for mounting said panel includes a pair of spaced guide means positioned in said visor body and extending along opposite sides of said panel.

32. The apparatus as defined in claim 31 wherein said means for mounting said panel further includes a movable slide including ends guidably supported by said guide means.

33. The apparatus as defined in claim 32 and further including means for pivotally mounting said panel to said movable slide to permit said panel to be adjustably pivoted on an axis parallel to said visor body and adjacent a lower edge of said visor body when in an extended position.

34. The apparatus as defined in claim 33 wherein said means for pivotally mounting said panel includes hinge means extending between said movable slide and said panel.

35. The apparatus as defined in claim 34 and further including a mirror mounted to said panel in a position to be partially circumscribed by said illumination means.

36. A visor for a vehicle comprising:
   a visor body having a slot formed therein from an edge of said body and extending into said body for receiving a panel assembly;
   a panel assembly including a U-shaped illumination means mounted thereto;
   mirror means mounted to said panel assembly to be partially circumscribed by said U-shaped illumination means; and
   means for mounting said panel assembly to said visor body for movement between a retracted position within said visor body and an extended position for use of said mirror means.

37. The apparatus as defined in claim 36 and further including means for mounting said visor body to a vehicle for movement between raised and lowered positions.

38. The apparatus as defined in claim 37 wherein said means for mounting said panel assembly to said visor body includes means for pivoting said panel assembly when in an extended position permitting use of said mirror means and illumination means when said visor body is in a variety of positions.

39. The apparatus as defined in claim 36 wherein said illumination means includes a U-shaped recess formed in said panel assembly and extending adjacent three edges thereof, and a plurality of spaced bulbs positioned in said panel assembly in alignment with said recess, and a light transmissive panel covering said recess for dispersing light from said bulbs.

40. The apparatus as defined in claim 39 wherein said panel assembly includes front and rear panels and wherein said mirror is mounted to said front panel and said recess is formed in said front panel, said illumination means further including a pair of spaced conductive strips mounted to said rear panel on a side facing said front panel and shaped to define sockets for holding said bulbs in position aligned with said light transmissive panel.

41. The apparatus as defined in claim 40 wherein said means for mounting said panel assembly to said visor body includes means for pivoting said panel assembly when in an extended position permitting use of said mirror means and illumination means when said visor body is in a variety of positions.

42. The apparatus as defined in claim 41 wherein said means for pivoting includes a pair of hinge means coupled to opposite sides of said panel assembly and having conductive pins extending into electrical contact with said conductive strips, and means for coupling said pins to the vehicle's electrical source of operating power to apply operating power to said bulbs.

43. The apparatus as defined in claim 42 wherein said means for mounting said panel assembly to said visor body includes a pair of spaced guide means positioned in said visor body and extending along opposite sides of said panel assembly and including electrical contacts which selectively engage said panel assembly.

44. The apparatus as defined in claim 43 wherein said means for mounting said panel assembly to said visor body further includes a movable slide including ends for receiving said conductive pins, said ends guidably supported by said guide means for positioning ends of said conductive pins in alignment with said electrical contacts such that as said panel assembly is moved to an extended position operating power is applied from said electrical contacts to said conductive pins for actuating said bulbs.

45. The apparatus as defined in claim 36 and further including latch means mounted to said panel assembly for releasably holding said panel in said stored position.

46. The apparatus as defined in claim 45 wherein said means for mounting said panel assembly includes a pair of spaced guide means positioned in said visor body and extending along opposite sides of said panel.

47. The apparatus as defined in claim 46 wherein said means for slidably mounting said panel assembly further includes a movable slide including ends guidably supported by said guide means.

48. The apparatus as defined in claim 47 wherein said means for pivotally mounting said panel assembly includes hinge means extending between said movable slide and said panel.

49. The apparatus as defined in claim 48 wherein said means for mounting said panel assembly further includes an X-shaped bracket defined by two legs pivotally coupled to each other where the legs cross and wherein one end of each leg is pivotally coupled to one of said visor body or movable slide and the other end of each leg pivotally and slidably coupled to the other of said visor body or movable slide such that said panel is stabilized in its movement between a stored position within said visor body and a use position extended from said visor body.

50. An automotive visor comprising:
a visor body including slot means formed along a lower edge thereof and extending in said body for receiving a slide-out panel;
a panel shaped to fit within said slot of said visor body; and
means for slidably mounting said panel to said visor body, said mounting means including an X-shaped bracket defined by two legs pivotally coupled to each other and wherein one end of each leg is pivotally coupled to one of said visor body or said panel and the other end of each leg is pivotally and slidably coupled to the other of said visor body or said panel such that said panel is stabilized in its movement between a stored position within said visor body and a use position extended from said visor body.

51. An automotive visor comprising:
a visor body including slot means formed along a lower edge thereof for receiving a slide-out panel;
a panel including a mirror mounted thereto, said panel shaped to fit within said slot of said visor body; and
means for slidably mounting said panel to said visor body, said mounting means including an X-shaped bracket defined by two legs pivotally coupled to each other and wherein one end of each leg is pivotally coupled to one of said visor body or panel and the other end of each leg pivotally and slidably coupled to the other of said visor body or panel such that said panel is stabilized in its movement between a stored position within said visor body and a use position extended from said visor body.

52. The apparatus as defined in claim 51 wherein said panel further includes means for providing illumination for use of said mirror under low ambient light.

53. An illuminated adjustable panel for a vehicle comprising:
a mounting member attached to a vehicle and having a slot formed therein for receiving a panel;
a panel including illumination means;
means for mounting said panel to said member for movement between a retracted position within said member and an extended position; and
means for pivotally mounted said panel to said first named mounting means to permit said panel to be pivoted on an axis parallel to said member when in an extended position such that light from said illumination means can be directed.

54. The apparatus as defined in claim 53 wherein said mounting member comprises a visor adapted to be mounted to a vehicle for movement between a raised stored position and a lowered sun blocking position.

55. The apparatus as defined in claim 54 and further including a mirror mounted to said panel for use as a vanity mirror.

56. The apparatus as defined in claim 53 wherein said means for mounting said panel to said member includes an X-shaped bracket defined by two legs pivotally coupled to each other and wherein one end of each leg is pivotally coupled to one of said member or said panel and the other end of each leg is pivotally and slidably coupled to the other of said member or said panel such that said panel is stabilized in its movement between a stored position within said member and a use position extended from said member.

57. An automotive visor comprising:
a visor body including slot means formed therein along a lower edge thereof for receiving a slide-out panel;
a panel including a mirror mounted thereto, said panel shaped to fit within said slot of said visor body;
U-shaped illumination means mounted to said panel adjacent the edges thereof to partially circumscribe said mirror; and
means for slidably mounting said panel to said visor body, said mounting means including an X-shaped bracket defined by two legs pivotally coupled to each other and wherein one end of each leg is pivotally coupled to one of said visor body or panel and the other end of each leg is pivotally and slidably coupled to the other of said visor body or panel such that said panel is stabilized in its movement between a stored position within said visor body and a use position extended from said visor body.

58. An automotive visor comprising:
a visor body including slot means formed therein from a lower edge thereof for receiving a slide-out panel;
a panel including a mirror mounted thereto, said panel shaped to fit within said slot of said visor body;
U-shaped illumination means mounted to said panel adjacent the edges thereof to partially circumscribe said mirror;
means for slidably mounting said panel to said visor body, said mounting means including an X-shaped bracket defined by two legs pivotally coupled to each other where the legs cross and wherein one end of each leg is pivotally coupled to one of said visor body or panel and the other end of each leg pivotally and slidably coupled to the other of said visor body or panel such that said panel is stabilized in its movement between a stored position within said visor body and a use position extended from said visor body; and
means for pivotally mounting said panel to said first named mounting means to permit said panel to be pivoted on an axis parallel to said visor body and adjacent a lower edge of said visor body when in an extended position such that light from said illumination means can be directed by movement of said panel.

* * * * *